United States Patent
Batta et al.

(10) Patent No.: US 8,033,149 B2
(45) Date of Patent: Oct. 11, 2011

(54) METHOD AND SYSTEM FOR COLLECTING LOCATIONING INFORMATION IN A WIRELESS LOCAL AREA NETWORK

(75) Inventors: Puneet Batta, Sunnyvale, CA (US); Ram Nagarajan, Sunnyvale, CA (US)

(73) Assignee: Symbol Technologies, Inc., Holtsville, NY (US)

(*) Notice: Subject to any disclaimer, the term of this patent is extended or adjusted under 35 U.S.C. 154(b) by 239 days.

(21) Appl. No.: 12/409,973

(22) Filed: Mar. 24, 2009

(65) Prior Publication Data

US 2010/0246419 A1    Sep. 30, 2010

(51) Int. Cl.
*G01R 31/08*    (2006.01)
(52) U.S. Cl. ..... 70/252; 370/445; 370/328; 370/395.21; 370/461; 370/462; 370/447
(58) Field of Classification Search ......... None
See application file for complete search history.

(56) References Cited

U.S. PATENT DOCUMENTS

| | | | |
|---|---|---|---|
| 6,907,229 B2* | 6/2005 | Shpak | 455/69 |
| 7,065,325 B2* | 6/2006 | Zegelin et al. | 455/67.11 |
| 7,385,345 B2* | 6/2008 | Chang | 313/496 |
| 2009/0102642 A1* | 4/2009 | Huseth et al. | 340/539.13 |
| 2009/0197613 A1* | 8/2009 | Wu et al. | 455/456.1 |

* cited by examiner

*Primary Examiner* — Huy Vu
*Assistant Examiner* — Kibrom T Hailu

(57) ABSTRACT

A technique is provided for determining estimated location of a wireless communication device (WCD) in a network. A first AP transmits a first RSSI data request message, including a BSSID to the WCD at a first time over a radio channel. The WCD then transmits a first response message to the first AP, which then transmits a first measured RSSI value to a trilateration engine (TE). At a different, second time, a second AP can switch to the radio channel and transmit a second RSSI data request message that includes the BSSID of first AP to the WCD over the radio channel. In response, the WCD transmits a second response message to the second AP, which then transmits a second measured RSSI value to the TE. A third AP performs a similar message exchange. This technique collects RSSI information from the WCD at the APs without disrupting any of their connections.

20 Claims, 3 Drawing Sheets

METHOD AND SYSTEM FOR COLLECTING LOCATIONING INFORMATION IN A WIRELESS LOCAL AREA NETWORK

TECHNICAL FIELD

The present invention generally relates to computer networks and, more particularly, to wireless local area networks (WLANs).

BACKGROUND

A conventional wireless local area network (WLAN) can include a plurality of access points or access ports or APs. These APs can be fixed at known locations. An AP allows wireless communication devices (WCDs) associated with that AP to wirelessly connect to a wired network. Each AP connects to a wired network either directly or indirectly via a wireless switch, and can relay data between the WCD and wired computing devices operating as part of the network.

To determine the location of WCDs that are operating in a WLAN, trilateration techniques have been developed. For instance, if a WCD is known to be within communication range of three or more APs, then the estimated location of the WCD can be determined by collecting Received Signal Strength Indicator (RSSI) information at three or more APs, and then using that RSSI information to estimate the distance between the WCD and each of the APs. Once the estimated distances between the WCD and each of the APs are known they can be used along with the coordinates of the APs to determine the estimated location of the WCD.

One technique for collecting RSSI information involves time synchronizing all APs, then causing the APs to simultaneously tune to the same pre-agreed channel at a pre-agreed interval. Each AP then detects a frame sent from the WCD to the APs. One drawback to this approach is that synchronizing multiple access points to switch to a channel at a pre-agreed time is difficult to manage. Another problem is that when its time to locate the WCD, all other APs (except for the one AP that is currently associated with the WCD) are forced to switch to a different channel (i.e., the channel the WCD and its associated AP are communicating on). As such, those APs are forced to drop whatever they are doing (e.g., supporting voice calls on a different channel, etc) since they need to switch "off channel." This is disruptive to the other WCDs communicating via those APs and does not allow the APs to accommodate local communication conditions by switching to the pre-agreed channel at different times. Moreover, this approach does not scale well to large sites with many APs since synchronization task becomes more difficult.

Another technique for collecting RSSI information involves having the WCD send out a frame (e.g., an IEEE 802.11 probe request frame) on all supported channels within a very short interval of time so that the WCD is "heard" by all nearby APs. Each AP can then measure RSSI information when the frame is detected. A drawback of this approach is that WCDs will only probe when they need information on the network and/or are about to roam. A WCD that happens to be in good communication range of an AP, does not probe very often. Moreover, for the WCD, probing all channels is disruptive for data transfer on the current channel.

Still another technique for collecting RSSI information involves having APs attempt to detect frames from the WCD that is to be located by periodically scanning all channels other than the one they are currently receiving over, and measuring RSSI information if a frame is detected. Such off-channel scanning techniques also have drawbacks. For instance, because there are a large number of channels to be scanned, the duration of each scan (i.e., amount of time spent per channel) and the frequency of each scan (i.e., periodicity with which a channel is scanned) are low. Moreover, the probability of detecting a frame from a WCD during a scan on a particular channel depends greatly on the WCD's activity level (i.e., probability drops significantly if the particular WCD is not particularly active). Thus, detecting a frame from a particular WCD on one of these scans is an inherently "low-probability" endeavor.

Thus, it would be desirable to provide improved techniques for collecting RSSI information at APs in a network so that the RSSI information can be used to locate a WCD operating among APs within the network.

SUMMARY

In accordance with some embodiments of the present disclosure, a method and system are provided for determining estimated location of a wireless communication device (WCD) operating in a network. The network includes at least three access points (APs) that will be referred to below as a first access point, a second access point, and a third access point, where the first access point is the AP that the wireless communication device is currently associated with.

The first access point transmits a first Received Signal Strength Indicator (RSSI) data request message to the wireless communication device (WCD) at a first time over a radio channel. The first RSSI data request message includes a basic service set identifier (BSSID) of the first access point. The WCD then transmits a first response message to the first access point, and in response to the first response message the first access point transmits a first measured RSSI value to a trilateration engine.

At a second time different that the first time, the second access point transmits a second RSSI data request message to the WCD over the radio channel. For instance, the second access point can switch to the radio channel at the second time, which is different than the radio channel the second access point normally operates on, and transmit the second RSSI data request message to the WCD over the radio channel. The second RSSI data request message includes the BSSID of first access point. In response, the WCD transmits a second response message to the second access point. In response to the second response message, the second access point transmits a second measured RSSI value to the trilateration engine. Similarly, the third access point transmits a third RSSI data request message to the WCD over the radio channel. The third RSSI data request message also comprises the BSSID of the first access point. In response, the WCD transmits a third response message to the third access point, and in response to the third response message, the third access point transmits a third measured RSSI value to the trilateration engine.

In one implementation, each response message is a RSSI data response message. In such implementations, the WCD can measure, in response to the first RSSI data request message, a first RSSI value associated with the first RSSI data request message to generate a first measured RSSI value, and then transmit a first RSSI data response message to the first access point that includes the first measured RSSI value for the first RSSI data request message. Similarly, the WCD can measure a second RSSI value for the second RSSI data request message to generate a second measured RSSI value, and transmit a second RSSI data response message to the second access point that includes the second measured RSSI value for the second RSSI data request message. Likewise, the WCD can measure, in response to the third RSSI data request message, a third RSSI value for the third RSSI data request message to generate a third measured RSSI value, and then transmit a third RSSI data response message from the WCD to the third access point that comprises the third measured RSSI value for the third RSSI data request message.

In another implementation, the WCD is not configured to interpret the RSSI data request messages as requests for RSSI information. In such implementations, the response messages generated by the WCD are acknowledgment (ACK) messages that do not include RSSI measurements, but instead can be used by the respective APs to measure RSSI values. The access points can then send the measured RSSI values (corresponding to each of the ACK messages) to the trilateration engine. In this implementation, upon receiving the first ACK message at the first access point, and the first access point can measure a first RSSI value for the first ACK message to generate a first measured RSSI value. Likewise, upon receiving the second ACK message, the second access point can measure a second RSSI value for the second ACK message to generate a second measured RSSI value. Similarly, upon receiving the third ACK message, the third access point can measure a third RSSI value for the third ACK message to generate a third measured RSSI value.

Regardless of how the measured RSSI values are obtained by the APs, the processing at the trilateration engine is the same. That is, the trilateration engine can then convert the first measured RSSI value into a first estimated distance value that indicates the distance between the WCD and first AP, the second measured RSSI value into a second estimated distance value that indicates the distance between the WCD and second AP, and the third measured RSSI value into a third estimated distance value that indicates the distance between the WCD and the third AP. The trilateration engine also stores coordinates of the first AP, the second AP, and the third AP and can determine the estimated location of the WCD based on the coordinates of the first AP, the second AP, and the third AP, the first estimated distance value, the second estimated distance value, and the third estimated distance value. For example, in one implementation, this can be done by defining a first circle having a radius equal to the first estimated distance value and being centered at the coordinates of the first AP, defining a second circle having a radius equal to the second estimated distance value and being centered at the coordinates of the second AP, and defining a third circle having a radius equal to the third estimated distance value and being centered at the coordinates of the third AP, and then using trilateration to determine a point, within an intersection between the first circle, the second circle and the third circle, that corresponds to the estimated location of the WCD with respect to the first, second and third APs.

This method and system can be used to collect RSSI information from the WCD at the APs without disrupting the connection of the WCD and the first AP that it is currently associated with, without disrupting the connections between the other second and third APs and any other WCDs that are currently communicating with the second and third APs, without requiring the WCD to send probe requests to the APs, and without the need to synchronize the APs.

BRIEF DESCRIPTION OF THE DRAWINGS

The present invention will be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, or brief summary. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Network Architecture

Figure 1:
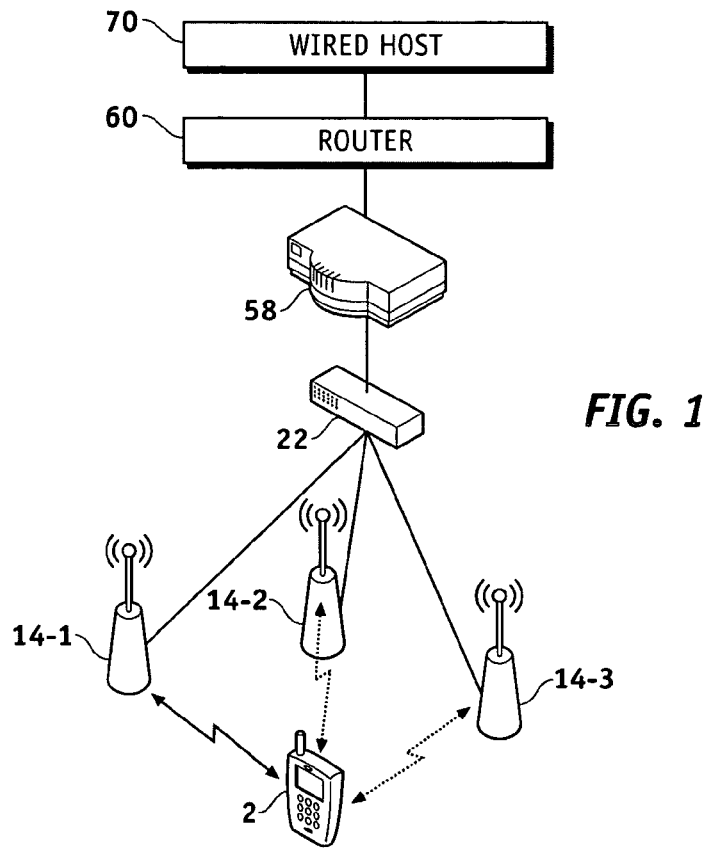
FIG. 1 is a simplified block diagram of a wireless local area network (WLAN)

FIG. 1 is a simplified block diagram of a wireless local area network (WLAN) 100. The WLAN 100 shown in FIG. 1 comprises a wireless client device 2, a wireless switch device 12 having a plurality of access ports (APs) 14 coupled thereto, a L2 switch device 58 coupled to the wireless switch device 12, a L3 router 60 coupled to the L2 switch 58, and a wired host system 70 coupled to the L3 router 60.

Wireless switch device 22 supports a subnet (A) and is coupled to access ports (APs) 14-1, 14-2, 14-3. The wireless switch device 22 and associated access ports 14 are separate physical devices. The wireless client device 2 is associated with AP 14-1 (as indicated by the solid line, double-ended arrow) and can communicate with the wired host system 70 (e.g., a server) through a network that includes the access ports 14-1, the wireless switch device 22, L2 switch devices 58, and the L3 router 60. The wireless client device 2 is also within communication range of APs 14-2, 14-3 (as indicated by the dashed line, double-ended arrows).

As used herein, a "wireless client device" can generally refer to a portable or "mobile" wireless communication device or other hardware with which an access network communicates. The wireless client device 2 can physically move around the WLAN, but at any given time may be mobile or stationary and can include devices that communicate through a wireless channel. The WCD 2 can be any of a number of types of mobile computing devices, which include without limitation, mobile stations (e.g. mobile telephone handsets, mobile radios, mobile computers, laptop computers, a PC card, personal digital assistants (PDAs), or the like), computers, wireless gaming devices, access terminals, subscriber stations, user equipment, compact flash, external or internal modem, or any other devices configured to communicate via wireless communications. Although not illustrated in FIG. 1, the WCD 2 can comprise one or more processors/controllers, transceivers, and/or other suitable components. WCDs are well-known in the art and need not be discussed at length here. Although not illustrated, each AP can serve multiple wireless client devices within a defined network area.

The access ports 14 are devices that enable remote wireless stations to communicate with a local area network (LAN). In general, an access port is a network-capable device containing a transceiver and antenna for transmitting signals to and receiving signals from the remote client devices or stations. Access ports are sometimes referred to as thin access points (as opposed to "access ports"). Access ports differ from regular or "fat" access points in that access points have full MAC functionality, whereas access ports have reduced MAC functionality. Another difference is that access ports are usually implemented in conjunction with a wireless switch (or other centralized controller) and many of the higher level MAC functions that would be implemented in an access point are implemented at the wireless switch instead, and the wireless switch provides a single point of administration for all thin APs it configures, controls, manages, and secures the environment for these thin APs. By contrast, a fat AP is usually implemented without a wireless switch, and has sufficient program logic and processing power to allow it to enforce policies relating to access and usage, rather than working under the supervision of a centralized controller (e.g., wireless switch). A fat AP directly serves as the point of interconnection between the WLAN and a fixed wire network and allows wireless communication devices to be quickly and easily connected to a wired LAN. In the fat AP implementations, the wireless protocol terminates at the AP as opposed to the wireless switch as in a wireless switch/access port architecture.

The wireless switch device 22 is coupled to at least three access ports (AP) (and possibly more than three APs). For sake of simplicity, in FIG. 1 the wireless switch 22 is shown as having three APs associated therewith. However, it will be appreciated that, while not shown in FIG. 1, the wireless switch 22 can have more than three APs associated therewith. In one embodiment, the wireless switch device 22 includes a locationing module (not illustrated) that include a trilateration engine that can be used to compute the location of the WCD 2, as will be described below.

As used herein, the term "wireless switch device" refers to a network entity that configures, controls and manages a plurality of access ports. Examples of wireless switch devices are disclosed in, for example, U.S. Pat. No. 7,173,922, entitled "Multiple wireless local area networks occupying overlapping physical spaces" assigned to the assignee of the present invention, its contents being incorporated by reference in its entirety herein; and U.S. Pat. No. 7,173,923, entitled "Cell Controller Adapted to Perform A Management Function" assigned to the assignee of the present invention, its contents being incorporated by reference in its entirety herein. In U.S. Pat. Nos. 7,173,922, and 7,173,923, a wireless switch is referred to as a cell controller. Wireless switches are also described, for example, in United States Patent Application Serial Number US 2007/0177435 A1, filed Jan. 11, 2007, entitled "System For Multiple Wireless Local Area Networks," and assigned to the assignee of the present invention, which is incorporated herein by reference in its entirety; United States Patent Application Publication Number 2007/0109994A1 entitled "Cell Controller For Multiple Wireless Local Area Networks," filed Jan. 11, 2007, which is incorporated by reference herein in its entirety; U.S. patent application Ser. No. 11/831,778, filed Jul. 31, 2008, entitled "FORWARDING BROADCAST/MULTICAST DATA WHEN WIRELESS CLIENTS LAYER 3 ROAM ACROSS IP SUBNETS IN A WLAN," and assigned to the assignee of the present invention, which is incorporated herein by reference in its entirety; and U.S. patent application Publication Ser. No. 11/831,781 entitled "ARCHITECTURE FOR SEAMLESS ENFORCEMENT OF SECURITY POLICIES WHEN ROAMING ACROSS IP SUBNETS IN IEEE 802.11 WIRELESS NETWORKS," assigned to the assignee of the present invention and filed Jul. 31, 2007, which is incorporated by reference herein in its entirety.

As described, for example, in U.S. Pat. No. 7,173,923, much of the MAC layer functionality that was traditionally provided at a conventional access point can be implemented in the wireless switch device so that "dumb" or "thin" access ports can be used instead of "smart" or "thick" access points.

The wired Layer 2 (L2) switch device 58 (also known as an Ethernet switches) are networking devices that operate at Layer 2, sometimes referred to as the Data Link Layer, of the well-known seven layer Open Systems Interconnection (OSI) communication model. A wired L2 switch typically provides wired networking services/functions and features such as Layer 2 Ethernet switching, Layer 3 routing, firewall service, etc. As such, a wired L2 switch typically includes wired input/output interfaces such as Ethernet ports, token ring ports, etc., and includes modules for performing packet forwarding. A wired L2 switch typically receives data packets and forwards them based on information contained in their headers, which for a wired L2 switch are headers corresponding to L2 wired networking protocols including IEEE 802.3 Ethernet, IEEE 802.5 token-ring, etc.

The L3 router 60 provides connectivity to the wired host system 70. Each interface on the router 60 is associated with an independent IP subnet. Traffic that goes between interfaces (i.e. between IP subnets) is routed using standard rules of IP. The wired host system 70 can be, for example, a workstation, any application server including mail server, web server, file server, DNS server, streaming video server, instant messaging server, gaming server, etc. In one embodiment, the wired host system 70 includes a locationing module (not illustrated) that include a trilateration engine that can be used to compute the location of the WCD 2, as will be described below.

Figure 2:
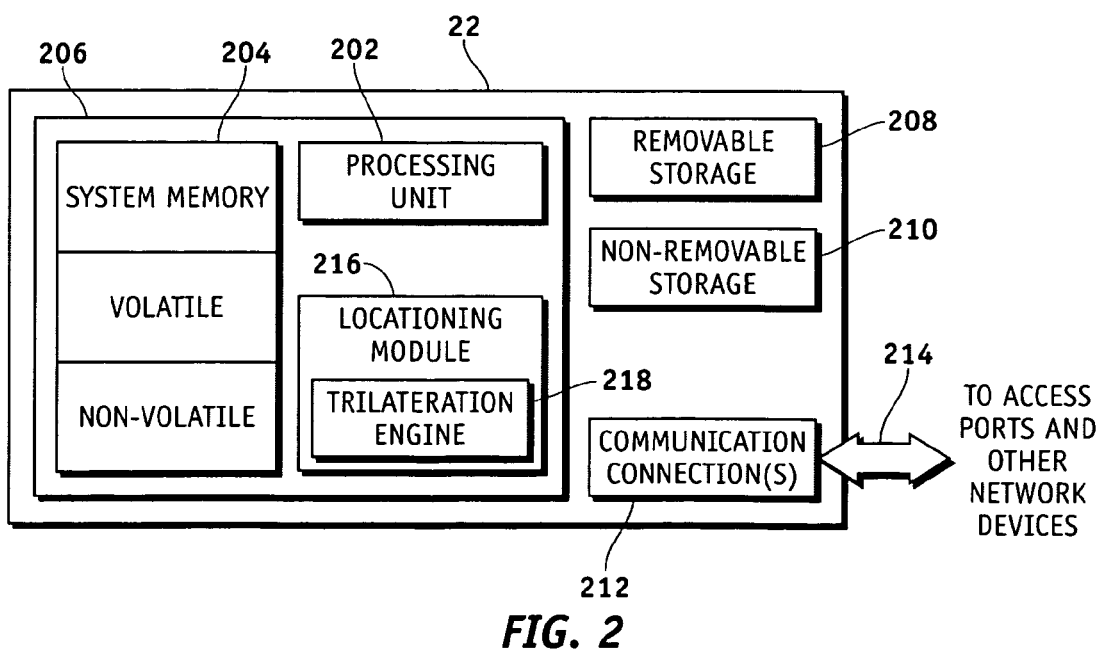
FIG. 2 is a simplified block diagram of an exemplary wireless switch.

FIG. 2 is a simplified block diagram of an exemplary wireless switch 22. Wireless switch 22 is only one example of a wireless switch and is not intended to suggest any limitation as to the scope of use or functionality of the invention. Other well known configurations that may be suitable for use with the invention include, but are not limited to, personal computers, server computers, multiprocessor systems, microprocessor-based systems, programmable consumer electronics, network PCs, minicomputers, mainframe computers, distributed computing environments that include any of the above systems or devices, and the like.

Wireless switch 22 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

Wireless switch 22 typically includes at least some form of computer readable media. Computer readable media can be any available media that can be accessed by wireless switch 22 and/or by applications executed by wireless switch 22. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage (e.g., hard disks) or other magnetic storage devices (e.g., MRAM), or any other medium which can be used to store the desired information and which can accessed by wireless switch 22. Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal.

Referring again to FIG. 2, in its most basic configuration, wireless switch 22 typically includes at least one processing unit 202 and memory 204. Depending on the exact configuration and type of computing system 22, memory 204 may be volatile (such as random access memory (RAM)), non-volatile (such as a hard disk, ROM, flash memory, etc.) and most often some combination of the two. This most basic configuration is identified in FIG. 2 by reference number 206. Additionally, wireless switch 22 may also have additional features/functionality. For example, wireless switch 22 may also include additional storage (removable and/or non-removable) including, but not limited to, magnetic or optical disks or tape. Such additional storage is illustrated in FIG. 2 by removable storage 208 and non-removable storage 210. Memory 204, removable storage 208, and non-removable storage 210 are all examples of computer storage media as defined above.

Wireless switch 22 also includes communications connection(s) 212 that allow the system to communicate with other network devices, such as access ports (APs) 14 and layer 3 routers 58, over interfaces 214. Communications connection(s) 212 may be associated with the handling of communication media as defined above. In one implementation each communications connection(s) 212 can include one or more network adapters that include transceiver and modem functionality. As used herein, the term "network adapter" can refer to computer hardware designed to allow computers to communicate over a computer network. The network adapters can comprise, for example, a communications modem, wired and/or wireless transceivers, and/or any other devices that can communicate over, for example, an IP network.

A wireless switch device includes wired Ethernet interfaces for a plurality of access ports it supports, and serves as a termination point for a "wireless" protocol, such as the IEEE 802.11 protocol. To explain further, client device(s) communicate with an AP over the air via wireless packets (e.g., IEEE 802.11 data packets), and the AP passes the wireless packets to the wireless switch over a wire that connects the wireless switch and the AP. In other words, the wireless switch communicates wireless packets encapsulated in wired packets (e.g., IEEE 802.11 packets encapsulated in IEEE 802.3 packets) with the AP. A wireless switch device receives data packets, going to or received from one of its connected access ports, and processes those data packets, which would have traditionally been processed by a "thick" access point. A packet forwarding module of a wireless switch device forwards those data packets based on information contained in their L2 headers, which for a wireless switch are headers corresponding to L2 wireless networking protocols including IEEE 802.11, etc. For instance, in the context of IEEE 802.11 networks, a wireless switch decapsulates inbound IEEE 802.11 data packets received from client device via an access port into IEEE 802.3 packets, and converts/encapsulates outbound IEEE 802.3 packets destined for a client device into IEEE 802.11 data packets before passing them on to an AP for transmission to the wireless client device. This way, the wireless switch can determine information including, but not limited to, Received Signal Strength Indicator (RSSI), locationing information, in-activity timers and a list of active clients. In addition to IP mobility functions (e.g., IEEE 802.11), a wireless switch (WS) also performs a number of additional functions including, for example, management of APs and MHs, locationing, Wireless Intrusion Detection System (IDS), security (IEEE 802.11i, IPsec VPN, SSL VPNs). The wireless switch then Layer-2 switches the resulting 802.3 packet onto the wire. If the 802.3 packet is destined to the wireless switch itself, then the wireless switch routes the IP packet based on its "routing table." In addition to Layer 2 (L2) switching and Layer 3 (L3) or IP routing of data packets, a wireless switch (WS) also performs or provides a number of additional services/functions that can include networking services, wireless services, configuration services, security services, administration services, application services, high availability services, packet forwarding services, and system management services. Examples of these services and functions are described in U.S. patent application Ser. No. 12/182, 852, filed July 30, 228, entitled "Wireless Switch With Virtual Wireless Switch Modules," and assigned to the assignee of the present invention, which is incorporated herein by reference in its entirety. In addition, in one embodiment, the wireless switch includes a locationing module 216 that will be described below with reference to FIGS. 3 and 4. The locationing module 216 receives RSSI information from the APs 14 and provides this RSSI information to a trilateration engine 218. The engine 218 can then compute the estimated or probable location of the WCD 2 based on this RSSI information and known coordinates of the APs 14.

Figure 3:
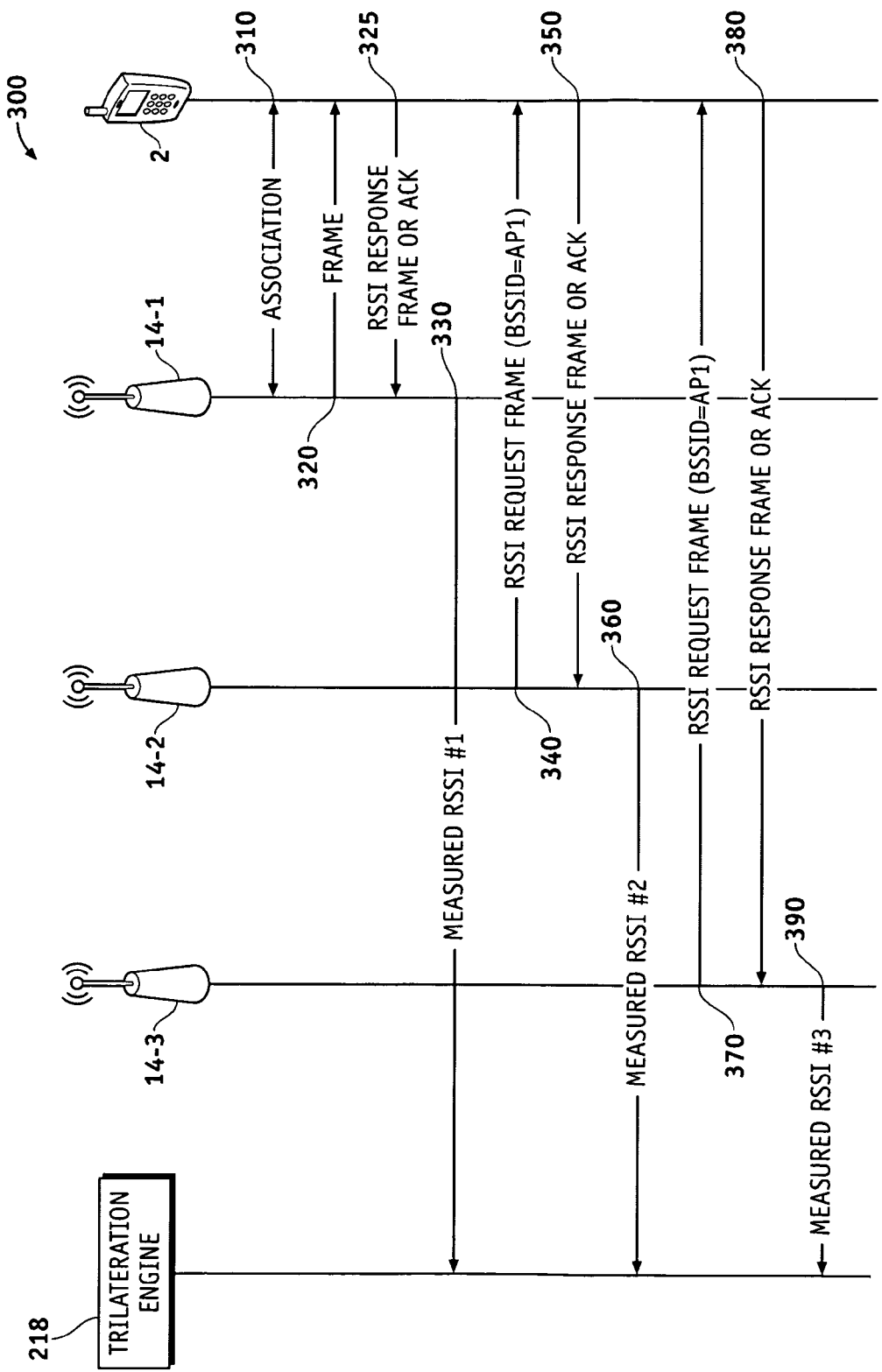
FIG. 3 is a message flow diagram that illustrates a method for collecting locationing information in a WLAN in accordance with some embodiments of the present disclosure.

FIG. 3 is a message flow diagram that illustrates a method 300 for collecting locationing information in a WLAN in accordance with some embodiments of the present disclosure.

In this embodiment, at step 310, the WCD 2 undergoes an association process with AP 14-1. Association enables the AP 14-1 to allocate resources for and synchronize with a network interface card (NIC) of the WCD 2. In general, the WCD 2 sends an association request frame to the AP 14-1 that carries information about the NIC (e.g., supported data rates) and the SSID of the network it wishes to associate with. After receiving the association request, the AP 14-1 considers associating with the NIC, and establishes an association ID for the NIC. When the AP 14-1 accepts the association request from the radio NIC of the WCD 2, the AP 14-1 sends an association response frame containing an acceptance notice to the radio NIC of the WCD 2. The association response frame includes information regarding the association, such as association ID and supported data rates. The NIC of the WCD 2 can then utilize the AP 14-1 to communicate with other NICs on the network and systems on the distribution (i.e., Ethernet) side of the AP 14-1. Once the WCD 2 becomes associated with AP 14-1, the NIC of the WCD 2 will process frames it receives which have a basic service set identifier (BSSID) that uniquely identifies AP 14-1 it is currently associated with. The BSSID is usually the MAC address of AP 14-1. The NIC of the WCD 2 identifies the AP 14-1 by parsing the BSSID of any frame it receives. Thus, when the WCD 2 is currently associated with AP 14-1, the hardware in the NIC will only receive and forward frames 'up' the stack if the BSSID is the same as that of its currently associated AP 14-1.

At step 320, AP 14-1 sends a regular IEEE 802.11 data frame with a special payload (e.g., a special ether-type (0×8781)) to WCD 2. This regular IEEE 802.11 data frame will have a BSSID of AP 14-1 since AP 14-1 is the source of the frame. At step 325 WCD 2 responds to the frame by transmitting either a first acknowledgment (ACK) message (e.g., IEEE 802.11 MAC level ACK)) or a first RSSI data response message (or frame). The specific message transmitted will depend on the implementation since some WCDs are configured to process RSS data requests that are included as part of the special payload, while other WCDs are not configured to process the special payload. In one implementation in which the WCD 2 is configured to interpret the special payload (of the frame from the AP 14-1) as a request for RSSI information, the WCD 2 measures a first Received Signal Strength Indicator (RSSI) value for the frame that was received at step 320, and includes the first measured RSSI value as part of a first RSSI data response frame. Upon receiving the first RSSI data response frame, the AP 14-1 determines whether the first RSSI data response frame includes a measured RSSI value measured by the WCD 2. In this implementation, because the RSSI data response frame includes the first measured RSSI value, at step 330, the AP 14-1 sends the first measured RSSI value to the trilateration engine 218, which stores it for later use. In other WCD implementations, in which the WCD 2 is not configured to interpret the special payload (of the frame from the AP 14-1) as a request for RSSI information, the WCD 2 responds by transmitting a first ACK message that does not include the first measured RSSI value. Upon receiving the first ACK message, at step 330, the AP 14-1 measures a first RSSI value associated with the first ACK message, and sends the first measured RSSI value to the trilateration engine 218, which again stores it for later use. As will be described below, the trilateration engine 218 can translate either of these first measured RSSI values into an estimated distance value that indicates the distance between the WCD 2 and AP 14-1. In one implementation, the trilateration engine 218 can be implemented at the wireless switch 22. In other implementations, the trilateration engine 218 can be implemented at any other network infrastructure device (e.g., a network server, such as wired host 70).

At step 340, AP 14-2 switches from its normal radio channel (i.e., the radio channel it normally operates on) to the radio channel that WCD 2 is currently communicating on and sends a RSSI data request frame to WCD 2. In the disclosed embodiments, the AP 14-2 is free to schedule when it wants to tune to the specific radio channel that WCD 2 is communicating on and therefore does not have to drop its existing communication session, but can instead wait to tune to the radio channel (that the WCD 2 is communicating on), and then transmit this special RSSI data request frame. For instance, the AP 14-2 can wait for an opportune time when it does not need to worry about supporting regular traffic of WCDs that are associated with it and switch to the radio channel that is normally used by AP 14-1, and then transmit its RSSI data request message. As above, this RSSI data request frame is "special" since it can be of certain type or sub-type and will include the BSSID of AP 14-1 so that WCD 2 will process and respond to the RSSI data request frame. Again, depending on the specific WCD implementation, the WCD 2 can respond to the RSSI data request frame by transmitting either with an RSSI data response frame or an ACK message. By using the BSSID of AP-1, the AP 14-2 basically impersonates AP 14-1 so the NIC of the WCD 2 will acknowledge and process the RSSI data request frame. In one implementation in which the WCD 2 is configured to interpret the RSSI data request frame as a request for RSSI information, the WCD 2 measures a second RSSI value for the RSSI data request frame that was received at step 340, and responds to the RSSI data request frame by transmitting a second RSSI data response frame at step 350 that includes the second measured RSSI value. Upon receiving the second RSSI data response frame, the AP 14-2 determines that it includes a second measured RSSI value measured by the WCD 2, and at step 360, the AP 14-2 extracts the second measured RSSI value and sends the second measured RSSI value to the trilateration engine 218, which stores it for later use. In another implementation, when the WCD 2 is not configured to interpret the special payload (of the RSSI data request frame) as a request for RSSI information, the WCD 2 responds by transmitting a regular ACK message that does not include the second measured RSSI value. In this case, at step 360, the AP 14-1 measures a second RSSI value associated with the second ACK message, and sends this second measured RSSI value to the trilateration engine 218, which stores it for later use. As will be described below, the trilateration engine 218 can translate this second measured RSSI value into another estimated distance value that indicates the distance between the WCD 2 and AP 14-2.

At step 370, AP 14-3 switches from the regular radio channel that it normally operates on to the radio channel that WCD 2 is currently communicating on and sends another RSSI data request frame to WCD 2. This RSSI data request frame is "special" since it will include the BSSID of AP 14-1 so that WCD 2 will process and respond to the RSSI data request frame. This way, the AP 14-3 basically impersonates AP 14-1 so the NIC of the WCD 2 will process the RSSI data request frame. In one implementation, in which the WCD 2 is configured to interpret the RSSI data request frame as a request for RSSI information, the WCD 2 measures a third RSSI value associated with the RSSI data request frame that was received at step 370, and responds to the RSSI data request frame by transmitting a RSSI data response frame at step 380 that includes the third measured RSSI value. Upon receiving the third RSSI data response frame, the AP 14-3 determines that the third ACK message includes the third measured RSSI value (as measured by the WCD 2), and at step 390, the AP 14-3 sends the third measured RSSI value to the trilateration engine 218, which stores it for later use. In another implementation, when the WCD 2 is not configured to interpret the special payload (of the RSSI data request frame from the AP 14-3) as a request for RSSI information, the WCD 2 responds by transmitting a regular ACK message (that does not include the third measured RSSI value), and at step 390, the AP 14-1 measures a third RSSI value associated with the third ACK message, and then sends the third measured RSSI value to the trilateration engine 218, which stores it for later use. As will be described below, the trilateration engine 218 can translate this third RSSI value into another estimated distance value that indicates the distance between the WCD 2 and AP 14-3. Once the trilateration engine 218 has three estimated distance values it can use this information along with known coordinates of the APs to determine an estimated location of the WCD 2.

Thus, in accordance with embodiments of the present disclosure, APs 14-1 . . . 14-3 can obtain RSSI information from the WCD 2 (1) without disrupting the connection of the WCD 2 with its AP 14-1, (2) without disrupting the connections between the APs 14-2, 14-3 and other WCDs that are currently communicating with those APs 14-2, 14-3 (since the APs 14-2 and 14-3 can switch off-channel according to their own schedule when they are not processing communications to or from their own WCDs), (3) without waiting for the WCD 2 to start sending probe requests that all the APs 14-1 . . . 14-3 must receive, and (4) without the need to synchronize the APs 14-1 . . . 14-3.

Figure 4:
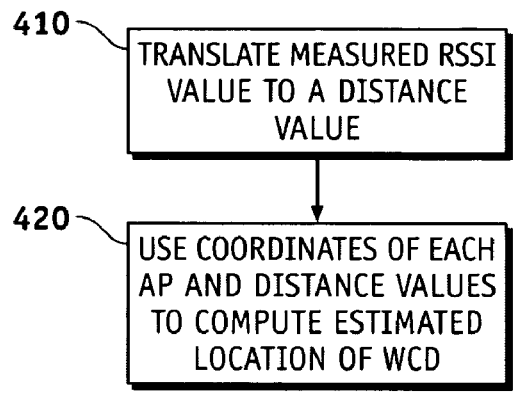
FIG. 4 is a flowchart illustrating a method performed at a trilateration engine for determining an estimated location of a WCD based on RSSI values provided from APs in accordance with some embodiments of the present disclosure.

FIG. 4 is a flowchart illustrating a method 400 performed at a trilateration engine 218 for determining an estimated location of a WCD 2 based on RSSI values provided from three APs 14-1 . . . 14-3 in accordance with some embodiments of the present disclosure. The trilateration engine 218 has information available (e.g., information pre-configured by an administrator) that describes the coordinates of the APs 14-1 . . . 14-3. In some implementations, the trilateration engine 218 can use the coordinates of the APs 14-1 . . . 14-3 and the first, second and third measured RSSI values to determine the estimated location of the WCD 2 either on on-demand (for instance when a user clicks on a "locate" button on a GUI of the trilateration engine 218) or on a regular or periodic basis.

At step 410, the trilateration engine 218 translates or converts the first, second and third measured RSSI values provided from the three APs 14-1 . . . 14-3 into corresponding distance values that indicate the estimated distance between each AP 14-1 . . . 14-3 and the WCD 2. For instance, the trilateration engine 218 can translate or convert the first measured RSSI value from AP 14-1 into a corresponding distance value that indicates the estimated distance between AP 14-1 and the WCD 2, can translate or convert the seconed measured RSSI value from AP 14-2 into a corresponding distance value that indicates the estimated distance between AP 14-2 and the WCD 2, and can translate or convert the third measured RSSI value from AP 14-3 into a corresponding distance value that indicates the estimated distance between AP 14-3 and the WCD 2.

The measured Received Signal Strength Indicator (RSSI) values indicate the signal power at the receiver of the WCD 2 (or alternatively at the receiver of an AP). Using a path loss model, equations can be developed that represent the distance relationship between to points as a function of RSSI and other variables, and this way the measured RSSI values can be translated into a distance that estimates a probable distance between an AP and the WCD 2.

To explain further, when an RF signal travels from point A to point B, the strength of the signal will be reduced or attenuated. The unit of the attenuation is normally expressed in dB log scale. In one implementation of a path loss model, the free space path loss for line of sight (LOS) can be calculated by using the following equation (1):

$$\text{path\_loss(dB)} = -C + 20 \log_{10}(\text{Dist}_{feet}) + 20 \log_{10}(\text{frequency\_in\_MHz}) \quad (1)$$

For example, when a constant C=37.1, and the frequency is 2.4 Ghz and the transmitter and receiver are spaced one foot way from each other the loss is: $-37.1 + 20 \log 10(1) + 20 \log 10(2400) \sim = 30$ dB.

Receive signal strength indicator (RSSI) or receive signal level are commonly used metrics or measurements used in the RF communications to characterize the receive signal power at point B of a signal is transmitted from point A. For the purpose of generating contours of same RSSI level, in one model for characterizing RSSI, the following equation (2) can be used:

$$RSSI(\text{dBm}) = \quad (2)$$
$$P_{tx} + G_{tx} + G_{rx} - \text{path\_loss(dB)} - MP_{correction} - \sum_{i=1}^{M} \text{barrier\_loss}_i$$

Where:
$P_{tx}$=transmit power in dBm,
$G_{tx}$=transmit antenna gain in dBi,
$G_{rx}$=receive antenna gain in dBi,
path_loss=the signal attenuation in dB as calculated in equation (1),
$MP_{correction}$=multi-path correction headroom if specified (this parameter can be 0 if multi-path is not considered), and
Barrier loss=the attenuation in dB for each of the barriers between two points A and B. If there are M barriers in between, the sum of all the barrier loss should be added.

When equation (2) is solved for path_loss, equation (2) can be rewritten as equation (3):

$$\text{path\_loss(dB)} = \quad (3)$$
$$P_{tx} + G_{tx} + G_{rx} - RSSI(\text{dBm}) - MP_{correction} - \sum_{i=1}^{M} \text{barrier\_loss}_i$$

By substituting the path-loss component of equation (1) into equation (3), a relationship between RSSI and linear distance can be obtained. Substituting equation (3) into equation (1) and solving for the term $20 \log_{10}(\text{Dist}_{feet})$ results in equation (4).

$$20\log_{10}(\text{Dist}_{feet}) = -C - 20\log_{10}(\text{frequency\_in\_MHz}) + P_{tx} + \quad (4)$$
$$G_{tx} + G_{rx} - RSSI(\text{dBm}) - MP_{correction} - \sum_{i=1}^{M} \text{barrier\_loss}_i$$

When equation (4) is solved for the variable for $\text{Dist}_{feet}$ the result is equation (5)

$$\text{Dist}_{feet} = 10^{(x)/20} \quad (5),$$

where the variable $\text{Dist}_{feet}$ is the distance between point A and point B as a function of frequency, and where X is:

$$-C - 20\log_{10}(\text{frequency\_in\_MHz}) + P_{tx} + G_{tx} +$$
$$G_{rx} - RSSI(\text{dBm}) - MP_{correction} - \sum_{i=1}^{M} \text{barrier\_loss}_i$$

transmit power ($P_{tx}$) in dBm, transmit antenna gain ($G_{tx}$) in dBi, receive antenna gain ($G_{rx}$) in dBi, RSSI in dBm, multi-path correction headroom ($MP_{correction}$) (if specified or zero otherwise), and barrier loss in dB for each of the barriers that is in the line of sight projected from point A to point B. If there are M barriers in between, the sum of all the barrier loss should be added. It is to be appreciated that equations (1) through (5) represent one set of models, and are not intended as limiting. To the contrary, other equations can be used to represent the distance relationship between two points as a function of RSSI and other variables. For instance, the distance (Dist$_{feet}$) relationship between two points A and B can generally be represented as a function of RSSI as show in equation (6) as follows:

$$Dist_{feet} = 10^{\left(C - \log_{10}(frequency\_in\_MHz) - \frac{RSSI(dBm)}{20}\right)}, \quad (6)$$

where the variable Dist$_{feet}$ is the distance between point A and point B as a function of frequency in MHz, RSSI in dBm, and a constant (C) that can be determined based on other variables including one or more of transmit power (P$_{tx}$) in dBm, transmit antenna gain (G$_{tx}$) in dBi, receive antenna gain (G$_{rx}$) in dBi, multi-path correction headroom (MP correction), and barrier loss in dB for each of the barriers that is in the line of sight projected from point A to point B.

At step 420, the trilateration engine 218 uses the coordinates of each AP 14-1 . . . 14-3 and the corresponding distance values from each AP 14-1 . . . 14-3 to the WCD 2 to determine the estimated location of the WCD 2 by computing probable distance from the three nearby APs 14-1 . . . 14-3 to identify their intersection. Any RSSI-based trilateration technique can be used to make this location determination, where trilateration refers to a method for determining the intersections of three sphere surfaces given the centers and radii of the three spheres. When a two-dimensional coordinate system is used trilateration refers to methods for determining the intersections of three circular areas given the centers and radii of the three circular areas.

Figure 5:
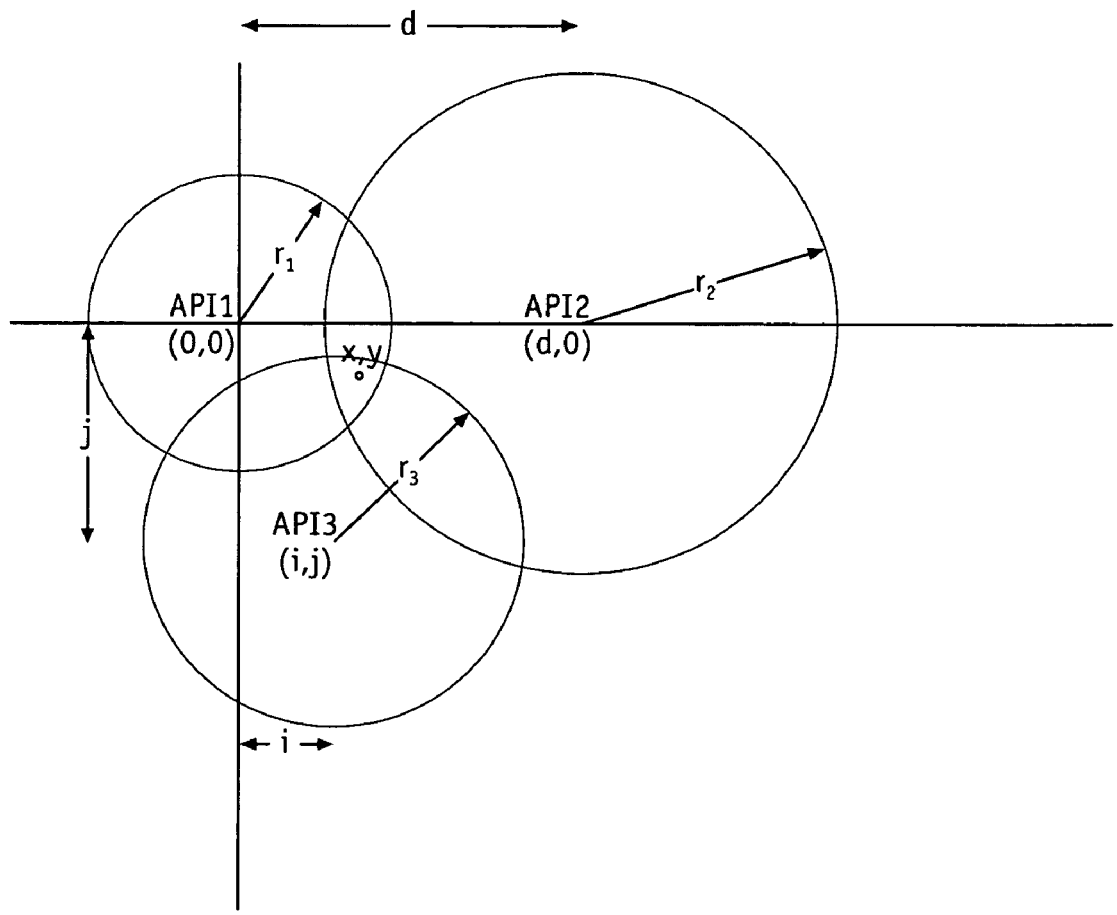
FIG. 5 is a graphical diagram that illustrates coordinates and dimensions used by a trilateration engine in determining a probable location of a WCD with respect to a plurality of APs in accordance with some embodiments of the present disclosure.

For example, in one exemplary implementation, the trilateration engine 218 can include logic for determining and processing the following variables specified in equations (7) and (8) as will be explained with reference to FIG. 5. FIG. 5 is a graphical diagram that illustrates coordinates and dimensions that can be used by a trilateration engine 218 in determining a probable location of a WCD 2 with respect to a plurality of APs 14-1 . . . 14-3 in accordance with some embodiments of the present disclosure.

In FIG. 5, a scenario is shown where a two-dimensional coordinate system is utilized and the relative coordinates of AP 14-1 . . . 14-3 can be specified in two dimensions. The trilateration engine 218 normalizes these coordinates by selecting one of the APs (AP 14-1 in this example) as being located at an origin point in an arbitrary coordinate system, and then defines the coordinates of other APs (AP 14-2 and 14-3 in this example) relative to AP 14-1. In this example, it can be assumed that AP 14-1 is located at origin (0,0) and is a relative distance (r$_1$) away from WCD 2, that AP 14-2 is located at a distance (d) from AP 14-1 and is a relative distance (r$_2$) away from WCD 2, and that AP 14-3 is located at coordinates (i,j) with respect to AP 14-1 and is a relative distance (r$_3$) away from WCD 2. In the following example, it will be assumed that based on the measured RSSI values, the trilateration engine 218 has determined that the relative distance (r$_1$) is 4 feet, that the relative distance (r$_2$) is 7 feet, and that the relative distance (r$_3$) is 5 feet. Further, it will be assumed that the distance (d) between AP 14-1 and AP 14-2 is 10 feet, and that AP 14-3 is located at coordinates (2.5 feet, 6 feet) with respect to AP 14-1.

Equations (7) and (8) can be used to determine a value of the probable x and y coordinates of WCD 2. In this example, the value of x would be ((16−49+100)/20) or 3.35, and the value of y is ((16−25−11.2225+0.7225+36)/12) or 1.375.

Since this is a two-dimensional coordinate system, z=0.

$$x = \frac{r_1^2 - r_2^2 + d^2}{2d}. \quad (7)$$

$$y = \frac{r_1^2 - r_3^2 - x^2 + (x-i)^2 + j^2}{2j} = \frac{r_1^2 - r_3^2 + i^2 + j^2}{2j} - \frac{i}{j}x. \quad (8)$$

It should be appreciated that equations (7) and (8) give an absolute value of the x and y coordinates. Because the coordinates of the WCD 2 must lie within a common area covered by all three APs 14-1 . . . 14-3, the trilateration engine 218 can run a check to ensure that the coordinates fall within a common coverage area of each AP. Here the x coordinate must have a positive value and the y coordinate must have a negative value. As such, the trilateration engine 218 will adjust the y coordinate such that it falls within the coverage areas of the APs 14-1 . . . 14-3. In other words, in this example, the trilateration engine 218 will determine that the WCD 2 is located at a relative position of 3.35, −1.375. The trilateration engine 218 can then adjust these coordinates relative to actual coordinates used in the system. For instance, if AP 14-1 is actually located at 14.0 feet, 62.375 feet, the coordinates of WCD 2 can be determined to be at 17.45 feet, 61.00 feet.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention. Thus, to the extent the description refers to certain features being "connected" or "coupled" together, unless expressly stated otherwise, "connected" or "coupled" means that one feature is directly or indirectly connected or coupled to another feature, and not necessarily mechanically. Although drawings depict exemplary arrangements of elements, additional intervening elements, devices, features, or components may be present in an actual embodiment assuming that the functionality of the circuit is not adversely affected. The connecting lines shown in the various figures represent example functional relationships and/or physical couplings between the various elements. Many alternative or additional functional relationships or physical connections may be present in a practical embodiment or implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, while the techniques and technologies described above have been described in the context of WLANs which in include wireless switches and access points (APs), it will be appreciated that these techniques and technologies can also be applied in environments where wireless switches are not utilized or where the functionality of the wireless switch is implemented within an access point (i.e., in a "fat" MAC access point). For instance, these techniques and technologies can be applied in a network which does not include separate wireless switch devices, but instead uses fat access points that have all of the functionality of a wireless switch device and one or more access ports merged together in one integrated unit. Moreover, while FIG. 2 shows one exemplary implementation where the trilateration engine is implemented at a wireless switch device, in other implementations the trilateration engine can be implemented at any other network device (e.g., server, access point, etc.).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

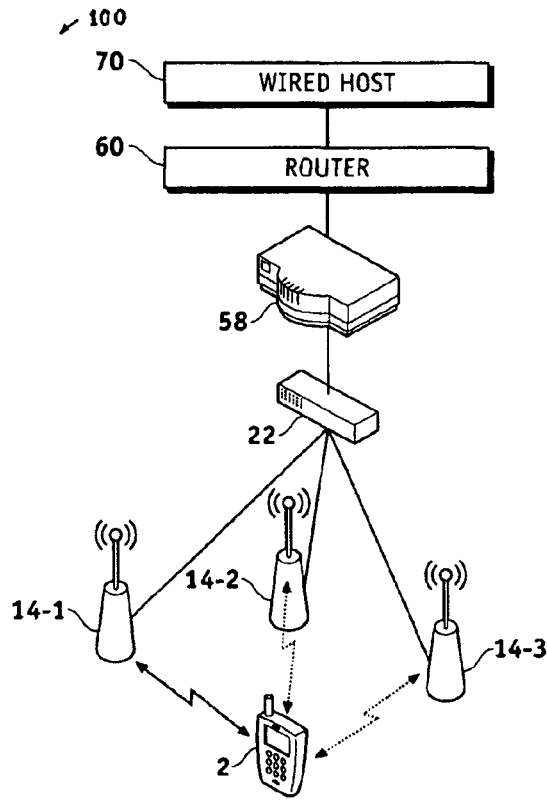

What is claimed is:

1. A method for determining estimated location of a wireless communication device operating in a network comprising a first access point that the wireless communication device is currently associated with, a second access point, and a third access point, the method comprising:

transmitting, from the first access point to the wireless communication device at a first time over a radio channel, a first Received Signal Strength Indicator (RSSI) data request message comprising a basic service set identifier (BSSID) of the first access point; transmitting a first response message from the wireless communication device to the first access point; and transmitting a first measured RSSI value from the first access point to a trilateration engine in response to the first response message;

switching, at the second access point, from a normal radio channel of the second access point to the radio channel, and transmitting a second RSSI data request message from the second access point to the wireless communication device over the radio channel at a second time different than the first time, wherein the second RSSI data request message comprises the BSSID of first access point; transmitting, in response to the second RSSI data request message, a second response message from the wireless communication device to the second access point; and transmitting a second measured RSSI value from the second access point to the trilateration engine in response to the second response message; and switching, at the third access point, from another normal radio channel of the third access point to the radio channel, and transmitting a third RSSI data request message from the third access point to the wireless communication device over the radio channel, wherein the third RSSI data request message comprises the BSSID of the first access point; transmitting, in response to the third RSSI data request message, a third response message from the wireless communication device to the third access point, and transmitting a third measured RSSI value from the third access point to the trilateration engine in response to the third response message.

2. A method according to claim 1, wherein each response message comprises a RSSI data response message, and wherein the step of transmitting a first RSSI data response message from the wireless communication device to the first access point, comprises the steps of:

measuring, at the wireless communication device in response to the first RSSI data request message, a first RSSI value for the first RSSI data request message to generate a first measured RSSI value, and transmitting a first RSSI data response message from the wireless communication device to the first access point, wherein the first RSSI data response message comprises: the first measured RSSI value for the first RSSI data request message; and, wherein the step of transmitting a second RSSI data response message from the wireless communication device to the second access point, comprises the steps of:

measuring, at the wireless communication device in response to the second RSSI data request message, a second RSSI value for the second RSSI data request message to generate a second measured RSSI value, and transmitting a second RSSI data response message from the wireless communication device to the second access point, wherein the second RSSI data response message comprises: the second measured RSSI value for the second RSSI data request message; and, wherein the step of transmitting a third RSSI data response message from the wireless communication device to the third access point, comprises the steps of:

measuring, at the wireless communication device in response to the third RSSI data request message, a third RSSI value for the third RSSI data request message to generate a third measured RSSI value, and transmitting a third RSSI data response message from the wireless communication device to the third access point, wherein the third RSSI data response message comprises: the third measured RSSI value for the third RSSI data request message.

3. A method according to claim 2, further comprising the step of:

converting, at the trilateration engine, the first measured RSSI value into a first estimated distance value that indicates the distance between the wireless communication device and first access point, the second measured RSSI value into a second estimated distance value that indicates the distance between the wireless communication device and second access point, and the third measured RSSI value into a third estimated distance value that indicates the distance between the wireless communication device and the third access point.

4. A method according to claim 3, wherein the step of converting, comprises:

converting, at the trilateration engine, the first measured RSSI value into a first estimated distance value that indicates the distance between the wireless communication device and first access point based on a function that specifies distance between the wireless communication device and the first access point as a function of RSSI and at least one other variable;

converting, at the trilateration engine, the second measured RSSI value into a second estimated distance value that indicates the distance between the wireless communication device and second access point based on a function that specifies distance between the wireless communication device and the second access point as a function of RSSI and the at least one other variable; and converting, at the trilateration engine, the third measured RSSI value into a third estimated distance value that indicates the distance between the wireless communication device and the third access point based on a function that specifies distance between the wireless communication device and the third access point as a function of RSSI and the at least one other variable.

5. A method according to claim 3, wherein the trilateration engine stores coordinates of the first access point, the second access point, and the third access point, and further comprising the step of:

determining, at the trilateration engine, the estimated location of the wireless communication device based on the coordinates of the first access point, the second access point, and the third access point, the first estimated distance value, the second estimated distance value, and the third estimated distance value.

6. A method according to claim 5, wherein the step of determining, at the trilateration engine, the estimated location of the wireless communication device, comprises:

defining, at the trilateration engine, a first circle having a radius equal to the first estimated distance value and being centered at the coordinates of the first access point, a second circle having a radius equal to the second estimated distance value and being centered at the coordinates of the second access point, and a third circle having a radius equal to the third estimated distance value and being centered at the coordinates of the third access point; and determining, at the trilateration engine based on trilateration, a point within an intersection between the first circle, the second circle and the third circle, wherein the point corresponds to the estimated location of the wireless communication device with respect to the first, second and third access points.

7. A method according to claim 1, wherein each response message comprises an acknowledgment (ACK) message, and further comprising the steps of:

receiving the first ACK message at the first access point, and measuring, at the first access point, a first RSSI value for the first ACK message to generate a first measured RSSI value to be sent to the trilateration engine;

receiving the second ACK message at the second access point, and measuring, at the second access point, a second RSSI value for the second ACK message to generate a second measured RSSI value to be sent to the trilateration engine; and receiving the third ACK message at the third access point, and measuring, at the third access point, a third RSSI value for the third ACK message to generate a third measured RSSI value to be sent to the trilateration engine.

8. A method according to claim 7, further comprising the step of:

converting, at the trilateration engine, the first measured RSSI value into a first estimated distance value that indicates the distance between the wireless communication device and first access point, the second measured RSSI value into a second estimated distance value that indicates the distance between the wireless communication device and second access point and the third measured RSSI value into a third estimated distance value that indicates the distance between the wireless communication device and the third access point.

9. A method according to claim 8, wherein the step of converting, comprises:

converting, at the trilateration engine, the first measured RSSI value into a first estimated distance value that indicates the distance between the wireless communication device and first access point based on a function that specifies distance between the wireless communication device and the first access point as a function of RSSI and at least one other variable;

converting, at the trilateration engine, the second measured RSSI value into a second estimated distance value that indicates the distance between the wireless communication device and second access point based on a function that specifies distance between the wireless communication device and the second access point as a function of RSSI and the at least one other variable; and converting, at the trilateration engine, the third measured RSSI value into a third estimated distance value that indicates the distance between the wireless communication device and the third access point based on a function that specifies distance between the wireless communication device and the third access point as a function of RSSI and the at least one other variable.

10. A method according to claim 8, wherein the trilateration engine stores coordinates of the first access point, the second access point, and the third access point, and further comprising the step of:

determining, at the trilateration engine, the estimated location of the wireless communication device based on the coordinates of the first access point, the second access point, and the third access point, the first estimated distance value, the second estimated distance value, and the third estimated distance value.

11. A method according to claim 10, wherein the step of determining, at the trilateration engine, the estimated location of the wireless communication device, comprises:

defining, at the trilateration engine, a first circle having a radius equal to the first estimated distance value and being centered at the coordinates of the first access point, a second circle having a radius equal to the second estimated distance value and being centered at the coordinates of the second access point, and a third circle having a radius equal to the third estimated distance value and being centered at the coordinates of the third access point; and determining, at the trilateration engine, a point within an intersection between the first circle, the second circle and the third circle, wherein the point corresponds to the estimated location of the wireless communication device with respect to the first, second and third access points.

12. A method according to claim 1, wherein the trilateration engine is implemented at the wireless switch.

13. A method according to claim 1, wherein the trilateration engine is implemented at a network server.

14. A wireless network for determining estimated location of a wireless communication device operating in the network, comprising:

a wireless communication device;

a network infrastructure computer comprising a trilateration engine;

a first access point that the wireless communication device is currently associated with, the first access point designed to: transmit to the wireless communication device at a first time over a radio channel, a first Received Signal Strength Indicator (RSSI) data request message comprising a basic service set identifier (BSSID) of the first access point; receive a first response message transmitted from the wireless communication device; determine a first measured RSSI value from the first response message; and transmit a first measured RSSI value to the trilateration engine in response to the first response message;

a second access point designed to switch from a normal radio channel of the second access point to the radio channel and then transmit a second RSSI data request message to the wireless communication device over the radio channel at a second time different than the first time, wherein the second RSSI data request message comprises the BSSID of first access point; receive a second response message from the wireless communication device in response to the second RSSI data request message; determine a second measured RSSI value from the second response message; and transmit a second measured RSSI value to the trilateration engine in response to the second response message;

a third access point designed to switch from another normal radio channel of the third access point to the radio channel and then transmit a third RSSI data request message to the wireless communication device over the radio channel, wherein the third RSSI data request message comprises the BSSID of the first access point; receive a third response message from the wireless communication device in response to the third RSSI data request message, determine a third measured RSSI value from the third response message; and transmit a third measured RSSI value to the trilateration engine in response to the third response message.

15. A wireless network according to claim 14, wherein each response message comprises a RSSI data response message, wherein the wireless communication device is designed to:

measure, in response to the first RSSI data request message, a first RSSI value for the first RSSI data request message to generate a first measured RSSI value, and transmit a first RSSI data response message to the first access point, wherein the first RSSI data response message comprises: the first measured RSSI value for the first RSSI data request message; and, measure, in response to the second RSSI data request message, a second RSSI value for the second RSSI data request message to generate a second measured RSSI value, and transmit a second RSSI data response message to the second access point, wherein the second RSSI data response message comprises: the second measured RSSI value for the second RSSI data request message; and, measure, in response to the third RSSI data request message, a third RSSI value for the third RSSI data request message to generate a third measured RSSI value, and transmit a third RSSI data response message to the third access point, wherein the third RSSI data response message comprises: the third measured RSSI value for the third RSSI data request message.

16. A wireless network according to claim 15, wherein the trilateration engine is designed to: convert the first measured RSSI value into a first estimated distance value that indicates the distance between the wireless communication device and first access point, convert the second measured RSSI value into a second estimated distance value that indicates the distance between the wireless communication device and second access point, and convert the third measured RSSI value into a third estimated distance value that indicates the distance between the wireless communication device and the third access point.

17. A wireless network according to claim 16, wherein the trilateration engine stores coordinates of the first access point, the second access point, and the third access point, and determines the estimated location of the wireless communication device based on the coordinates of the first access point, the second access point, and the third access point, the first estimated distance value, the second estimated distance value, and the third estimated distance value.

18. A wireless network according to claim 14, wherein each response message comprises an acknowledgment (ACK) messages, and wherein the first access point, upon receiving the first ACK message, measures a first RSSI value for the first ACK message to generate a first measured RSSI value and sends the first measured RSSI value to the trilateration engine; wherein the second access point, upon receiving the second ACK message, measures a second RSSI value for the second ACK message to generate a second measured RSSI value and sends the second measured RSSI value to the trilateration engine; and wherein the third access point, upon receiving the third ACK message, measures a third RSSI value for the third ACK message to generate a third measured RSSI value and sends the third measured RSSI value to the trilateration engine.

19. A wireless network according to claim 18, wherein the trilateration engine is designed to: convert the first measured RSSI value into a first estimated distance value that indicates the distance between the wireless communication device and the first access point based on a function that specifies distance between the wireless communication device and first access point as a function of RSSI and at least one other variable; convert the second measured RSSI value into a second estimated distance value that indicates the distance between the wireless communication device and the second access point based on a function that specifies distance between the wireless communication device and second access point as a function of RSSI and the at least one other variable; and convert the third measured RSSI value into a third estimated distance value that indicates the distance between the wireless communication device and the third access point based on a function that specifies distance between the wireless communication device and the third access point as a function of RSSI and the at least one other variable.

20. A wireless network according to claim 19, wherein the trilateration engine is designed to determine the estimated location of the wireless communication device by defining a first circle having a radius equal to the first estimated distance value and being centered at the coordinates of the first access point, a second circle having a radius equal to the second estimated distance value and being centered at the coordinates of the second access point, and a third circle having a radius equal to the third estimated distance value and being centered at the coordinates of the third access point; and determining a point within an intersection between the first circle, the second circle and the third circle, wherein the point corresponds to the estimated location of the wireless communication device with respect to the first, second and third access points.

* * * * *

UNITED STATES PATENT AND TRADEMARK OFFICE
CERTIFICATE OF CORRECTION

PATENT NO. : 8,033,149 B2
APPLICATION NO. : 12/409973
DATED : October 11, 2011
INVENTOR(S) : Batta et al.

It is certified that error appears in the above-identified patent and that said Letters Patent is hereby corrected as shown below:

The title page showing the illustrative figure should be deleted to be replaced with the attached title page.

On the Title page, in the Figure, delete " 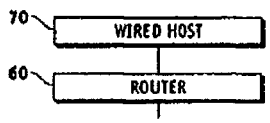 " and insert -- 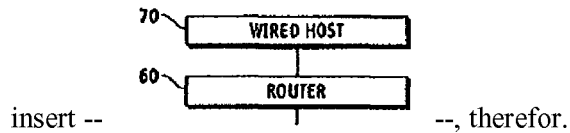 --, therefor.

In the Drawings:

In Fig. 1, Sheet 1 of 3, delete " 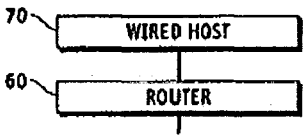 " and insert -- 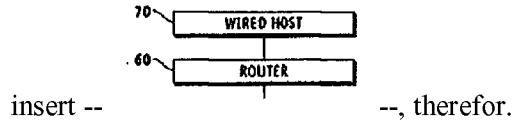 --, therefor.

Signed and Sealed this
Sixteenth Day of April, 2013

Teresa Stanek Rea
*Acting Director of the United States Patent and Trademark Office*

In Fig. 4, Sheet 3 of 3, delete " 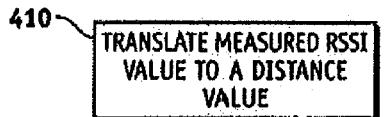 " and insert --  --, therefor.

In the Specifications:

In Column 8, Line 49, delete "SSID" and insert -- BSSID --, therefor.

In Column 9, Line 9, delete "ACK))" and insert -- ACK) --, therefor.

In Column 11, Line 30, delete "seconded" and insert -- second --, therefor.

In Column 11, Line 42, delete "between to points" and insert -- between points --, therefor.

In Column 13, Line 15, delete "(MP correction)," and insert -- ($MP_{correction}$), --, therefor.

In Column 15, Line 46, delete "terminal" and insert -- terminal. --, therefor.

CERTIFICATE OF CORRECTION (continued)

(12) United States Patent
Batta et al.

(10) Patent No.: US 8,033,149 B2
(45) Date of Patent: Oct. 11, 2011

(54) METHOD AND SYSTEM FOR COLLECTING LOCATIONING INFORMATION IN A WIRELESS LOCAL AREA NETWORK

(75) Inventors: Puneet Batta, Sunnyvale, CA (US); Ram Nagarajan, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 239 days.

(21) Appl. No.: 12/409,973

(22) Filed: Mar. 24, 2009

(65) Prior Publication Data

US 2010/0246419 A1    Sep. 30, 2010

(51) Int. Cl.
*G01R 31/08* (2006.01)

(52) U.S. Cl. ..... 70/252; 370/445; 370/328; 370/395.21; 370/461; 370/462; 370/447

(58) Field of Classification Search ......................... None
See application file for complete search history.

(56) References Cited

U.S. PATENT DOCUMENTS

| | | | |
|---|---|---|---|
| 6,907,229 B2 * | 6/2005 | Shpak | 455/69 |
| 7,065,325 B2 * | 6/2006 | Zegelin et al. | 455/67.11 |
| 7,385,345 B2 * | 6/2008 | Chang | 313/496 |
| 2009/0102642 A1 * | 4/2009 | Huseth et al. | 340/539.13 |
| 2009/0197613 A1 * | 8/2009 | Wu et al. | 455/456.1 |

* cited by examiner

*Primary Examiner* — Huy Vu
*Assistant Examiner* — Kibrom T Hailu

(57) ABSTRACT

A technique is provided for determining estimated location of a wireless communication device (WCD) in a network. A first AP transmits a first RSSI data request message, including a BSSID to the WCD at a first time over a radio channel. The WCD then transmits a first response message to the first AP, which then transmits a first measured RSSI value to a trilateration engine (TE). At a different, second time, a second AP can switch to the radio channel and transmit a second RSSI data request message that includes the BSSID of first AP to the WCD over the radio channel. In response, the WCD transmits a second response message to the second AP, which then transmits a second measured RSSI value to the TE. A third AP performs a similar message exchange. This technique collects RSSI information from the WCD at the APs without disrupting any of their connections.

20 Claims, 3 Drawing Sheets